(12) United States Patent
Mehr

(10) Patent No.: US 10,497,126 B2
(45) Date of Patent: Dec. 3, 2019

(54) PRODUCING A SEGMENTED IMAGE USING MARKOV RANDOM FIELD OPTIMIZATION

(71) Applicant: DASSAULT SYSTEMES, Velizy Villacoublay (FR)

(72) Inventor: Eloi Mehr, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 15/850,218

(22) Filed: Dec. 21, 2017

(65) Prior Publication Data

US 2018/0189956 A1 Jul. 5, 2018

(30) Foreign Application Priority Data

Dec. 30, 2016 (EP) ..................................... 16306860
Dec. 30, 2016 (EP) ..................................... 16306861

(51) Int. Cl.
| | | |
|---|---|---|
| *G06K 9/00* | (2006.01) | |
| *G06T 7/143* | (2017.01) | |
| *G06T 7/174* | (2017.01) | |
| *G06T 7/00* | (2017.01) | |

(Continued)

(52) U.S. Cl.
CPC ................ *G06T 7/143* (2017.01); *G06T 7/11* (2017.01); *G06T 7/174* (2017.01); *G06T 7/187* (2017.01); *G06T 7/97* (2017.01); *G06T 2207/10016* (2013.01); *G06T 2207/10024* (2013.01); *G06T 2207/10028* (2013.01); *G06T 2207/10048* (2013.01)

(58) Field of Classification Search
CPC ..................... G06T 7/143; G06T 7/187; G06T 2207/10028; G06T 2207/10024; G06T 2207/10048; G06T 7/174; G06T 2207/10016; G06T 7/97
See application file for complete search history.

(56) References Cited

U.S. PATENT DOCUMENTS 5,710,830 A * 1/1998 Holeva ..................... F24C 7/06
                                                358/464
7,065,250 B1 * 6/2006 Lennon .................. G06K 9/469
                                                382/224

(Continued)

FOREIGN PATENT DOCUMENTS

WO WO 2016/050290 A1 4/1916

OTHER PUBLICATIONS

Extended Search Report dated May 29, 2017, in Europe Patent Application No. 16306861.2-1906. (15 pgs.).

(Continued)

*Primary Examiner* — Amir Alavi
(74) *Attorney, Agent, or Firm* — Oblon, McClelland, Maier & Neustadt, L.L.P.

(57) ABSTRACT

A computer-implemented method of producing a segmented image of a scene comprises providing a plurality of images of the scene, each image corresponding to a respective acquisition of a physical signal, the plurality of images including at least two images corresponding to different physical signals, and generating the segmented image based on the plurality of images, by determining a distribution of labels that minimizes an energy defined on a Markov Random Field (MRF). This improves the field of computer vision.

19 Claims, 7 Drawing Sheets

200  2A 220  2B

(51) Int. Cl.
*G06T 7/187* (2017.01)
*G06T 7/11* (2017.01)

(56) References Cited

U.S. PATENT DOCUMENTS

| | | | | |
|---|---|---|---|---|
| 7,085,401 | B2* | 8/2006 | Averbuch | G06K 9/38 |
| | | | | 382/103 |
| 7,706,610 | B2* | 4/2010 | Zhang | G06K 9/38 |
| | | | | 382/173 |
| 8,245,135 | B2* | 8/2012 | Cai | G06F 16/9562 |
| | | | | 715/254 |
| 9,141,854 | B2* | 9/2015 | Kim | G06K 9/00449 |
| 9,741,125 | B2* | 8/2017 | Baruch | G06T 7/187 |
| 10,168,879 | B1* | 1/2019 | Duan | G06F 3/04845 |
| 2016/0050431 | A1* | 2/2016 | Gupte | H04N 19/593 |
| | | | | 375/240.16 |
| 2018/0189956 | A1* | 7/2018 | Mehr | G06T 7/187 |
| 2018/0189957 | A1* | 7/2018 | Sanchez Bermudez | |
| | | | | G06T 7/187 |

OTHER PUBLICATIONS

Extended Search Report dated Jun. 1, 2017, in Europe Patent Application No. 16306860.4-1906. (14 pgs.).

Cristina Palmero, et al.; "Multi-modal RGB-Depth-Thermal Human Body Segmentation"; International Journal of Computer Vision, Kluwer Academic Publishers, Norwell, US; vol. 118, No. 2, Apr. 13, 2016; 23 pgs.

Gorkem Saygili, et al.; "Hybrid Kinect Depth Map Refinement for Transparent Objects"; 2014 22$^{nd}$ International Conference on Pattern Recognition; Aug. 2014; XP055372520; 6 pgs.

Jamie Shotton, et al.; "TextonBoost for Image Understanding: Multi-Class Object Recognition and Segmentation by Jointly Modeling Texture, Layout, and Context"; International Journal of Computer Vision, vol. 81, No. 1; Jul. 2, 2007; XP055372893; ISSN:0920-5691; 30 pgs.

Philipp Krahenbuhl, et al.; "Efficient Inference in Fully Connected CRFs with Gaussian Edge Potentials"; Retrieved From the Internet: URL:http://papers.nips.cc/paper/4296-efficient-inference-in-fully-connected-crfs-with-gaussian-edge-potentials.pdf [retrieved May 12, 2017]; XP055372465; 9 pgs.

Neda Salamati, et al.; "Incorporating Near-Infrared Information into Semantic Image Segmentation"; CORR, Jun. 24, 2014; XP055372853; 16 pgs.

L. Hoegner, et al.; "Towards People Detection from Fused Time-of-Flight and Thermal Infrared Images"; The International Archives of the Photogrammetry, Remote Sensing and Spatial Information Sciences; vol. XL-3; 2014; ISPRS Technical Commission III Symposium, Sep. 5-7, 2014; Zurich, Switzerland; 6 pgs.

Christian Hane, et al.; "Joint 3D Scene Reconstruction and Class Segmentation"; 8 pgs.

Abhijit Kundu, et al.' "Joint Semantic Segmentation and 3D Reconstruction from Monocular Video"; Georgia Institute of Technology, Atlanta, USA; 16 pgs.

Remo Ziegler, et al.; "3D Reconstruction Using Labeled Image Regions" Eurographics Symposium on Geometry Processing (2003); 12 pgs.

Evan Herbst, et al.; "Toward Online 3-D Object Segmentation and Mapping"; 8 pgs.

Carlos Leung, et al.; "3D Reconstruction through Segmentation of Multi-View Image Sequences"; Intelligent Real-Time Imaging and Sensing Group; School of Information Technology and Electrical Engineering; The University of Queensland, Brisbane, Queensland, 4072, Australia; 6 pgs.

Victor Adrian Prisacariu, et al.; "Simultaneous Monocular 2D Segmentation, 3D Pose Recovery and 3D Reconstruction"; University of Oxford; 14 pgs.

Ping-Cheng Kuo, et al.; "3D Reconstruction with Automatic Foreground Segmentation from Multi-View Images Acquired from a Mobile Device"; Department of Computer Science; National Tsing Hua University, Hsinchu, Taiwan; 15 pgs.

Adam D. Halpert, et al.; "Seismic Image Segmentation with Multiple Attributes"; Standford University; SEG Houston 2009 International Exposition and Annual Meeting; 5 pgs.

* cited by examiner

PRODUCING A SEGMENTED IMAGE USING MARKOV RANDOM FIELD OPTIMIZATION

CROSS-REFERENCE TO RELATED APPLICATIONS

This application claims priority under 35 U.S.C. § 119 or 365 to European Application No. 16306861.2 and No. 16306860.4, both filed Dec. 30, 2016. The entire contents of the above application(s) are incorporated herein by reference.

FIELD OF THE INVENTION

The invention relates to the field of computer vision, and more specifically to methods, systems and programs related to generating a segmented image of a scene based on image acquisition of physical signal data.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

A three-dimensional (3D) shape can be represented as surface based and volumetric. In surface based representations, 3D geometry is defined by a closed or open surface. The surface can be composed of triangles with vertices which are 3D points. The surface based representation is common in CAD/CAM and in computer information. In volumetric representation, the 3D shape is defined by a function $f(x, y, z)$ defined over the 3D space, either continuously or piecewise, by values stored in a voxel grid. The 3D-geometry is then further defined as the region in space which satisfies a certain value of the function. Generally, if $f(x, y, z)$ is scalar-valued, the shape is defined as $f(x, y, z) < s$ (or $f(x, y, z) > s$) where s an appropriate threshold value. The volumetric representation is common in medical applications, in particular computerized tomography. As a special case, the region may be defined as being a narrow band between a lower and upper limit, in which case the definition might be $s-w < f(x,y,z) < s+w$ for a narrow band of width 2w centered around s.

Image segmentation separates zones of an image, e.g. a two-dimensional (2D) image or a 3D image such as a 3D virtual object. For example, in a 2D image of an object taken indoors, image segmentation can include identifying the part of the image representing the floor and isolating that part from other features of the image, such as furniture, walls, etc. In a 3D-virtual object representing a person, segmentation can include distinguishing clothing from bare skin, or distinguishing the arm from the torso.

Segmentation can be employed in many image analysis tasks. For example, for a traffic control system, a computer coupled to a roadside camera can employ segmentation to identify and count passing cars. Similarly, in a surveillance system, image segmentation can identify a human figure in an image and localize joints and limbs, which can facilitate identification of intruders. Reconstruction of 3D shapes from images can also employ segmentation, for example, when the reconstruction includes identifying semantically important parts of the object.

In most existing solutions, segmentation is performed on image data containing color (e.g., red-green-blue (RGB)) data and optionally depth data. Depth data represents, for each pixel, the distance from the sensor. Depth data can be captured using available devices such as the Microsoft Kinect®, Asus Xtion™ or Google Tango™.

In this context, there is still a need for improving computer vision, and notably image segmentation.

SUMMARY

It is therefore provided a computer-implemented method of producing a segmented image of a scene. The segmented image includes pixels each assigned to a respective one of a set of segments. The method comprises providing a plurality of images of the scene. Each image corresponds to a respective acquisition of a physical signal. The plurality of images includes at least two images corresponding to different physical signals. The method also comprises generating the segmented image based on the plurality of images. The generation of the segmented image is performed by determining a distribution of labels that minimizes an energy defined on a Markov Random Field (MRF) graph. The MRF graph comprising nodes and edges. Each node corresponds to a respective pixel and is associated to a respective label. Each edge corresponds to a respective pair of pixels having a distance below a predetermined threshold. The labels correspond to all different assignments of a pixel to a respective one of the set of segments. The energy comprises a smoothness term that penalizes assignment of pairs of pixels that correspond to an edge to different segments. The penalization for any given pair decreases as a distance between the pixels of the given pair increases. The penalization for the given pair further decreases as a difference between the physical signal vectors corresponding to the pixels of the given pair increases.

The method may comprise any one or any combination of the following:
- the method constitutes a method of computer vision in a scene that includes one or more transparent objects and/or one or more reflecting objects;
- the plurality of images includes an infrared image and one or both of an RGB image and a depth image;
- the infrared image is a thermal image;

the scene is a building interior scene or a building exterior scene;

the scene comprises at least one biological entity;

the method comprises iterating the providing of a plurality of images and the generating of a segmented image of the scene to generate a plurality of segmented images of the scene, the method further comprising reconstructing a 3D model of the scene based on corresponding segments of the plurality of segmented images;

the corresponding segments of the plurality of segmented images based on which the reconstructing of a 3D model of the scene is performed all correspond to non-biological entities;

iterating the providing of a plurality of images is performed by providing a plurality of videos of the scene, each video corresponding to a respective video acquisition of a physical signal;

each video acquisition is performed with a camera on which a plurality of sensors are mounted, each sensor corresponding to a respective physical signal;

the camera is moved in the scene and simultaneously performs a plurality of video acquisitions each of a respective physical signal;

the smoothness term noted S is of the type $S=\Sigma_{(m,n) \in C} 1_{l_m \neq l_n} \text{dist}(m,n)^{-1} \text{pen}(\|x_m - x_n\|)$ where m and n are pixel indices, C is the set of edges of the Markov Random Field graph, $l_m$ is the label associated to pixel m and $l_n$ is the label associated to pixel n, $1_{l_m \neq l_n}$ is an indicator function equal to 1 when labels $l_m$ and $l_n$ are different and equal to 0 otherwise, $\text{dist}(m,n)^{-1}$ is the inverse of a distance between pixel m and pixel n, $x_m$ is the respective physical signal vector corresponding to pixel m and $x_n$ is the respective physical signal vector corresponding to pixel n, $\|x_m - x_n\|$ is a distance between physical signal vector $x_m$ and physical signal vector $x_n$, and pen( ) is a decreasing function;

pen( ) is of the type $\exp(-\beta \|x_m - x_n\|)$ where $\beta$ is a positive number;

the energy further comprises a data term that penalizes assignment of pixels each to any segment, the penalization being based for each pixel on a respective probability distribution that provides for each of the set of segments a respective probability that the pixel belongs to the segment independently of other pixels, the penalization for any given pixel increasing as the probability provided by the probability distribution respective to the given pixel decreases, the probability distributions being learnt based on a clustering of pixels;

the data term is of the type $U=\Sigma_n -\log P(l_n)$ where n is a pixel index, $l_n$ is the label of pixel n, and $P(l_n)$ is the probability provided by the probability distribution respective to pixel n for the segment corresponding to label $l_n$;

the method performs the clustering via a spectral clustering followed by an iteration of a fusion of segments, the number of segments reached when the iteration ends corresponding to the labels;

the probability distributions form a Gaussian mixture;

the Gaussian mixture is learnt by an Expectation-Maximization algorithm; and/or the energy is of the type $E(l)=U(l)+\lambda S(l)$ where $\lambda$ is a ponderation factor and l is a distribution of labels.

It is further provided a computer program comprising instructions for performing the method.

It is further provided a computer readable storage medium having recorded thereon the computer program.

It is further provided a system comprising a processor coupled to a memory, the memory having recorded thereon the computer program.

In examples, the system may comprise any one or any combination of the following:

the system further comprises a graphical user interface, the processor being coupled to the graphical user interface;

the graphical user interface is configured for displaying the segmented image of the scene and/or a representation of a 3D reconstruction of the scene;

the system further comprises one or more sensors configured for acquiring the plurality of images of the scene;

each sensor is configured for a respective acquisition of a physical signal to which a respective one of the plurality of images of the scene corresponds;

the one or more sensors comprise a material property sensor and one or both of an RGB sensor and a depth sensor;

the material property sensor is an infrared sensor;

the infrared sensor is a thermal sensor;

the system comprises one or more cameras on which the one or more sensors are mounted, the processor being coupled to the one or more cameras;

the one or more cameras are transportable;

the one or more cameras form the system and embed the processor and memory having recorded thereon the computer program, or alternatively, the system comprises a computer workstation embedding the processor and memory having recorded thereon the computer program, the computer workstation being wirelessly coupled to the one or more cameras;

each sensor is mounted on a distinct camera, or alternatively, the system comprises a (single) camera on which a plurality of sensors are mounted, for example all the sensors;

the one or more cameras are configured for video acquisition;

the single camera is configured for being moved in the scene and simultaneously performing a plurality of video acquisitions each of a respective physical signal, wherein by "simultaneously" it is meant that the acquisition (or "recording") starts at the same time (at least substantially) and ends at the same time (at least substantially) for all the acquired videos of the plurality, each sensor thus performing acquisition in parallel; and/or the videos of the plurality are all synchronized, wherein by "synchronized" it is meant that the videos of the plurality all have the same frequency and that their image frames are all captured at the same time (at least substantially).

BRIEF DESCRIPTION OF THE DRAWINGS

Embodiments of the invention will now be described, by way of non-limiting example, and in reference to the accompanying drawings, where.

DETAILED DESCRIPTION

Figure 1:
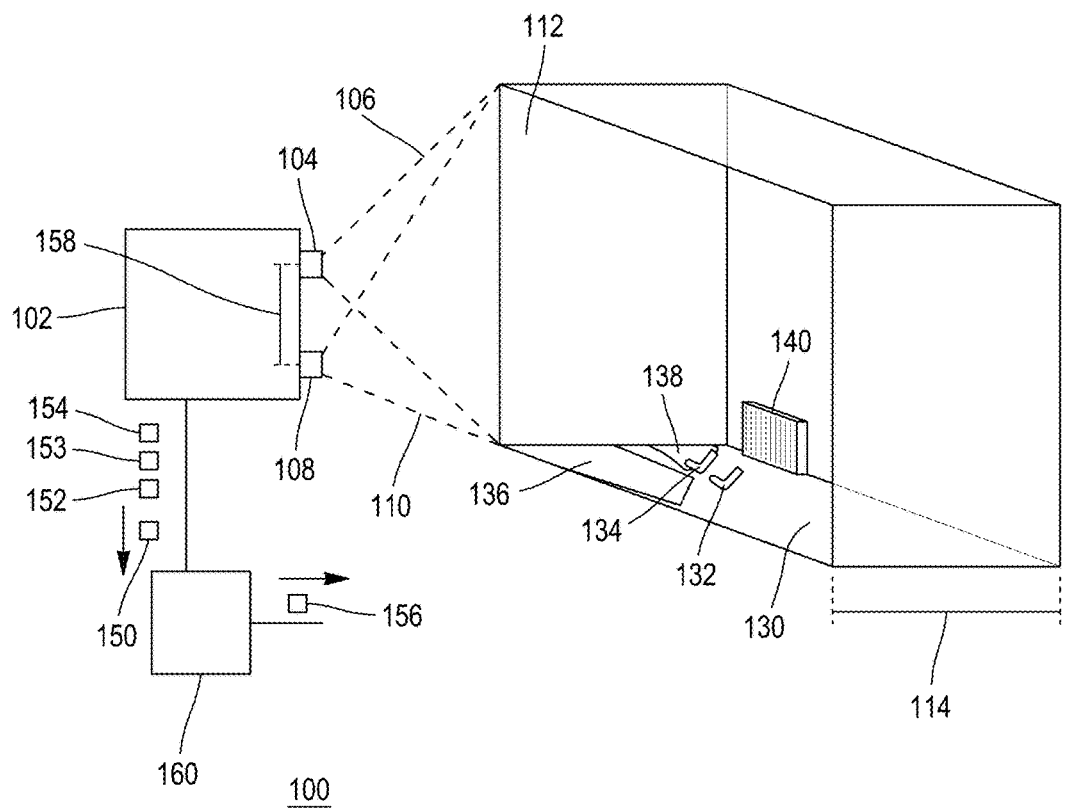
FIG. 1 is a high-level diagram illustrating an example of the present invention.

It is provided a method of computer vision in a scene. A "scene" is a subpart of the real world. The expression "computer vision" refers to methods of processing digital data including one or more images of a scene. An image of a scene is a representation of a distribution of a physical signal on the scene, for example a 2D or a 3D representation. A "physical signal" represents any type of physical property, for example a radiation emission in a given electromagnetic range. An "acquisition" of a physical signal is a measurement in a scene of a distribution of said physical signal. Such acquisition may be performed by a physical device which may be generically called "camera" and on which a sensor corresponding to said physical signal is mounted. Such a sensor is configured for sensing a physical signal and transform the physical signal into digital data also referred to as "digital signal". An image may be subdivided into subparts called "pixels" each to which a fixed value of the physical signal may be assigned. The subdivision may form a grid. The grid may be regular.

The provided method processes a plurality of images of the scene that each correspond to a respective acquisition of a physical signal. The expression "correspond to an acquisition of a physical signal" means for a given image that the given image stems from the result of said acquisition, for example because the given image is the (raw) result of said acquisition or because it is derived from said acquisition via a post-processing (e.g. a filtering such as a denoising).

The provided method relates to producing a segmented image of the scene. A segmented image of a scene is, as widely known, an image comprising additional information representing groups of pixels, each group being called "segment". A segment corresponds to a unitary entity in the scene, such as for example a same solid or liquid, a same material or a same color. The result desired from a segmentation depends on the contemplated application, such that a segmentation may be tuned in light of said contemplated application. The additional information may take any form. A segmented image includes information representing assignment of each pixel to a respective one of a set of segments. The different segments of the set of segments may be represented in any way, for example by a mere index. Alternatively or additionally, the segments may be associated to additional specifications, such as a meta-description of physical characteristics of the entity of the scene represented by the segment. This is however a mere matter of implementation and not further discussed herein.

The provided method comprises generating a segmented image of the scene based on a plurality of images, wherein the plurality of images includes at least two images corresponding to different physical signals. In other words, at least two different physical signals (i.e. physical data of different natures) are involved when generating the segmented image. This allows a more accurate segmentation than one that would rely on a single type of physical signal image acquisition. The different physical signals may indeed complement each other in terms of information brought to represent the scene, such that distinction of transitions between materials, colors or objects may be easier to perform when segmenting. Also, acquisition of a physical signal may involve a physical noise or data holes. Such "misleading information" associated to different physical signals being generally uncorrelated, the use of at least two images corresponding to different physical signals allows reducing the impact during the segmentation.

Basing the generation of a segmented image of a scene on a plurality of images corresponding to different physical signals may improve the segmentation of any type of scene. The improvement is all the more significant when the scene includes transparent objects and/or reflecting objects. A transparent object designates generally any real entity having at least one palpable surface which can be crossed by light. A reflecting object designates generally any real entity having a surface which reflects light. Such objects may include for example mirrors or metallic objects (which may be reflecting), building facades (which may be reflecting and/or transparent), or water entities such as puddles (which may be reflecting) or pools, lakes or sea surfaces (which may be reflecting and/or transparent). Transparent objects and/or reflecting objects perturb the segmentation because they produce misleading information for most sensors, including RGB sensors and depth sensors. Transparent objects are notably misleading to depth sensors, as depth sensors emit rays that cross the objects, thereby failing to provide correct depth information. Reflecting objects are notably misleading to RGB sensors, as their reflecting surfaces reflect other colors than those of the object. The use of different physical signals in the segmentation is thus particularly relevant to improve the result in such a case.

The plurality of images may in particular include an infrared image. Infrared images provide data that help performing a good segmentation even in the case of presence of one or more transparent objects and/or one or more reflecting objects in the scene. Combined with an RGB image and/or a depth image, an infrared image allows a particularly high quality segmentation in such a specific context.

Such a solution may thus be particularly appropriate when the scene is a building interior scene or a building exterior scene. A building interior scene is a scene inside a building. A building exterior scene (also called "urban scene" or "architectural scene") is an outside scene which comprises one or more building. Such scenes often comprise transparent objects and/or one or more reflecting objects, in particular building exterior scenes which comprise building facades and/or puddles.

Furthermore, such scenes often comprise biological entities, such as human beings. In such a case, an infrared image provides an accurate representation of such entities such that an infrared image can contribute to a particularly accurate segmentation of the scene. This is even more significant when the infrared image is a thermal image.

The segmentation of a scene may notably be applied to 3D reconstruction, that is, the automatic production of a 3D model of a scene based on acquisition of physical signal data.

A 3D reconstruction process may comprise iterating in a scene (i.e. performing several distinct times) provision of a plurality of images and generation of a segmented image of the scene as explained above. Each iteration may correspond to an acquisition of the plurality of physical signals (including at least two physical signals of a different type) to which the plurality of images of each iteration corresponds from a different viewpoint in the scene. For example, the iterations may correspond to moving a viewpoint in the scene. Parts of the scene present in different iteration images may then be used for the 3D reconstruction of the scene. Indeed, the availability of images representing such parts from different viewpoints allows inferring a 3D model of said parts. The 3D reconstruction process may in particular comprise reconstructing a 3D model of the scene based on corresponding segments of the plurality of segmented images (i.e. corresponding segments being segments corresponding to a same real-world physical entity). Improving the segmentation of a scene may thereby improve such a 3D reconstruction process. Such 3D reconstruction process is widely known.

Reconstructing a 3D model of the scene based on corresponding segments of a plurality of segmented images is generally well-known and examples are provided in the following papers, the solution of any of which being implementable herein:

"Ziegler et al., 3D Reconstruction Using Labeled Image Regions";

"Leung et al., 3D Reconstruction through Segmentation of Multi-View Image Sequences"; and "Kuo et al., 3D Reconstruction with Automatic Foreground Segmentation from Multi-View images Acquired from a Mobile Device".

Other examples of 3D reconstruction based on segmentation are provided in the following papers:

"Kundu et al., Joint Semantic Segmentation and 3D Reconstruction from Monocular Video", In ECCV 2014";

"Häne et al., Joint 3d scene reconstruction and class segmentation", in CVPR 2013";

"Yücer et al., Efficient 3D Object Segmentation from Densely Sampled Light Fields with Applications to 3D Reconstruction", in ACM Transactions on Graphics";

"Prisacariu et al., Simultaneous Monocular 2D Segmentation, 3D Pose Recovery and 3D Reconstruction", In ACCV 2012"; and "Herbst et al., Toward Online 3-D Object Segmentation and Mapping", In ICRA 2014".

It is herein proposed an optional improvement where the segments common to the plurality of segmented images (based on which the reconstruction of a 3D model of the scene is performed) all correspond to non-biological entities only.

In the case of building interior or exterior scenes, the presence of biological entities such as humans perturbs the 3D reconstruction process. Indeed, in such cases, the biological entities move between iterations of segmentations such that corresponding segments convey incorrect information for the 3D reconstructions. The exclusion of segments corresponding to such moving entities from the 3D reconstruction thereby improves accuracy and robustness of the 3D reconstruction. Improving accuracy of the segmentation with respect to biological entities is thus particularly relevant in a context of reconstructing building interior or exterior scenes.

Removing segments corresponding to biological entities from the set of segmented images (in order to perform the 3D reconstructions by putting segments into correspondence) may be performed in any way. As widely known biological entities have highly recognizable signatures such that such removal may be fast and easy.

In ergonomic examples, the 3D reconstruction process may be performed with one or more video cameras each acquiring a respective video of a respective one of the physical signals involved in the segmentation. For example, a same and single video camera may embed different sensors (each adapted to a respective physical signal, e.g. an infrared sensor, and a depth sensor and/or an RGB sensor), and a user, car or robot may move in a scene holding the camera and capturing each of the physical signals video streams involved in the segmentation. The videos may be synchronized, such that each frame allows generating an accurate segmented image of the scene as each generation involves different physical signals.

Generating a segmented image based on a plurality of images corresponding to different physical signals may generally be performed in any way. A particularly efficient way is to generate the segmented image with a Markov Random Field (MRF) energy minimization. Such a minimization can be performed particularly fast and robustly.

As widely known, an MRF energy minimization designates any algorithm that amounts to determining the distribution of so-called "labels" on a graph that minimizes an energy. The graph has, by definition, nodes and edges linking pairs of nodes. The graph may be called "MRF graph". The labels are, by definition, values of a predetermined set to be assigned to each node of the MRF graph (one label per node). When the predetermined set is discrete (as is the case herein), the MRF energy minimization may be performed according to different algorithms (referred to as "discrete MRF minimization algorithms") that converge particularly fast. Examples are provided later.

The energy may comprise different cost terms each defined as a sum on cliques (of the MRF graph) of a given order. The cost terms may include a unary term (also called "data term"), which is defined on all nodes. The cost terms may also include a binary or pairwise term (also called "smoothness term"), which is defined on pairs of nodes of the graph linked by an edge. When the set of labels is discrete and the energy does not include cost terms of a higher degree, the minimization may be performed according to different algorithms (referred to as "discrete pairwise MRF minimization algorithms") that converge yet more particularly fast. Existing algorithms are known. Again, examples are provided later.

In the present case, each node may correspond to a respective pixel of the segmented image and the labels may correspond to all different assignments of a pixel to a respective one of the set of segments. The minimization thus operates a segmentation by finding for each pixel an optimal assignment to a respective one of the set of segments.

An MRF graph links nodes supposed to have a correlation. In the present case, the MRF graph may be defined such that each edge corresponds to a respective pair of pixels having a distance below a predetermined threshold. The distance may be any distance, such as a Euclidian distance or a graph distance. The MRF graph may thus link pairs of pixels which are immediate neighbors, and optionally pairs of pixels farther from each other (possibly all pairs of pixels, provided that the threshold is large enough). Examples of implementation are provided later.

Now, the energy may be designed such that the optimal labeling depends on contributions or criteria taken from all the images of the plurality of images. For this reason, the following may refer to the expression "multi-criteria MRF".

In specific, the energy may comprise a smoothness term that penalizes assignment of pairs of pixels that correspond to an edge to different segments. In other words, the energy tends to assign pixels connected by an edge to a same segment, or yet in other words the energy forces proximate pixels to belong to a same segment. The penalization for any given pair decreases as a distance between the pixels of the given pair increases. In other words, the cost of two pixels connected by an edge not being assigned to a same segment is all the more important as the two pixels are located close on to the other (e.g. on the grid). The distance is here again any distance, for example a Euclidian distance. The penalization for the given pair further decreases as a difference between the physical signal vectors corresponding to the pixels of the given pair increases. In other words, the energy minimization considers vectors each assigned to a respective pixel. The space in which the vectors are defined is a space where each dimension corresponds to a respective one of the plurality of images. In other words, each coordinate of the vectors is the value of a respective modality or physical signal acquired by a corresponding one of the plurality of images. A distance between vectors is then contemplated. Again, the distance may be any distance, such as Euclidian distance (after centering and reduction or normalization) or an "after-weighting Euclidian distance". The cost of two pixels not being assigned to a same segment is then all the more important as their vectors are proximate.

Such a smoothness term takes good account of the different physical signal information available and operates an accurate segmentation based on that.

In many cases, the purpose of a segmentation is to identify a real-world material and/or color transition. For example, segmentation can differentiate between an artifact in the image, such as a shadow, and a real transition between two materials. Segmentation can also make segmentation invariant to illumination by introducing a chromaticity histogram. A class of photometric invariants can also separate material from shape and illumination. However, existing approaches are often fragile when they depend on only information from the image. Therefore, in many conditions the segmentation becomes impossible; for example, when a deep shadow partly covers a darkly colored object. Similarly, segmentation can also be difficult with a lightly colored object set against the sky, objects with shiny specularity, or a transition between two materials that are both of same color. These segmentation challenges can be insurmountable to existing image-based segmentation algorithms using only visible light.

In examples of the present invention, a system and method can associate the RGB/RGB-Depth/Depth capture to one or more other sensors capable of sensing material properties, including molecular sensors, such as the SCiO™ from Consumer Physics™, thermal sensors, and terahertz scanners. The information from these sensors complements the RGB/RGB-Depth/Depth data to segment the image more accurately. This segmentation can take place on the 2D image or on a 3D-reconstruction made by one of the RGB/RGB-Depth/Depth reconstruction approaches such as Kinect® Fusion. The segmentation can be employed for both 2D images or 3D reconstruction because the reconstruction approach typically associates RGB or depth pixels on the images to corresponding surface points on the reconstructed objects. In the case of a 3D shape reconstruction, the robustness of the segmentation is typically better than in the image case, because the set of images used is strongly overlapping and reveals many parts that can be hidden in a single image.

In examples of the present invention, employing material-property information in combination with color and depth information can segment objects in successively more cases and with much increased accuracy and robustness compared to existing methods.

In examples, a system, method, and non-transitory computer-readable medium can include, at a processor, aligning a first image with a second image. The first image and the second image represent different electromagnetic ranges of a substantially same scene. The method can further include generating a segmented image using both criteria from the first image and criteria from the second image. One or more criterion of the criteria from the first image can be unique from one or more criterion of the criteria from the second image. Criteria being unique can include criteria of different parts of the electromagnetic spectrum, including the visible light spectrum (approximately 300 to 700 nm), and infrared (700 nm to 1 mm), but other parts of the electromagnetic spectrum can be employed as well.

In examples, aligning the image can further include detecting features of the first image and the second image, matching the features to find pairwise correspondence between the first image and the second image, and warping at least one of the first image and the second image to align the first image to the second image.

In examples, aligning the images can further include applying data from (a) a provided calibration of sensors employed to generate the first image and the second image, and (b) a depth image of the scene.

In examples, the first image is a red-green-blue (RGB) color model image, and the second image is a material-property image.

In examples, the material-sensor image is an infrared image, thermal image, ultraviolet image, x-ray image, or gamma-ray image In examples, the method further includes capturing the first image and the second image from a respective first and second sensor that share a common physical mount and have a known relative positioning. Aligning the images can be further based on the known relative positioning.

In examples, generating the segmented image employs a Markov Random Field (MRF) approach.

In examples, the first image is an RGB color model image, and the second image is a material-property image.

In examples of the present invention, a computer system or method can fuse visible-light data from a scene with material property sensing data, such as infra-red data, thermal data, or depth data, to provide efficient, reliable and improved segmentation on a 2D image or 3D model of the scene.

FIG. 1 is a high-level diagram 100 illustrating an example of the present invention. A mounting apparatus 102 (or camera) is configured to mount an RGB sensor 104 and a material property sensor 108. The RGB sensor 104 and material property sensor 108 are a known calibration relative positioning 158 apart. The RGB sensor 104 images a scene 112 in the visual light spectrum from an RGB vantage point 106. The material property sensor 108 images the scene 112 in a material property spectrum, such as infrared (IR) radiation, from a material property vantage point 110. The calibration relative positioning 158 can be used to align the images from the RGB sensor 104 and material property sensor 108 being taken from the two different respective vantage points 106 and 110. A person of ordinary skill in the art can recognize that the RGB sensor 104 and material property sensor 108 mounted at a substantially same place of a single device, or a same sensor having a dual-function as an RGB sensor can be a same sensor, and therefore have a calibration relative positioning 158 of zero and the same vantage point 106 and 110 for each image as well.

Figure 2:
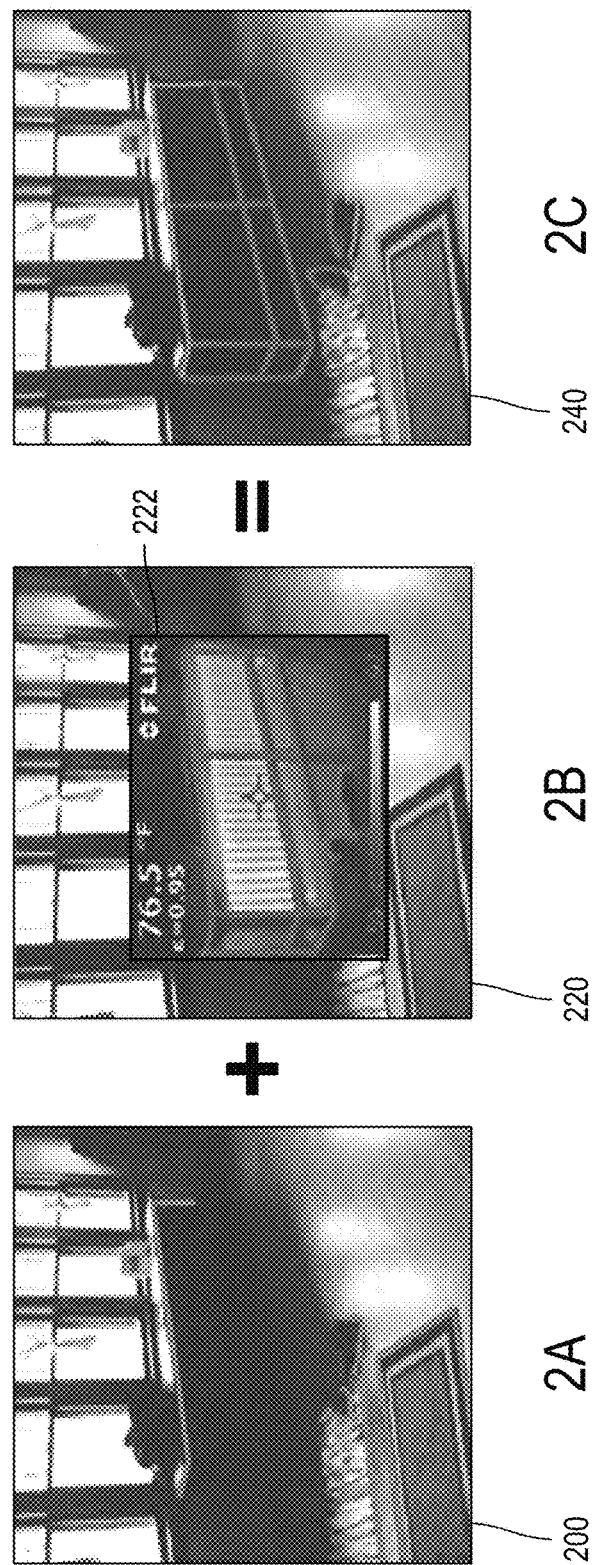
FIGS. 2A, B and C illustrate segmentation of a scene.

The scene 112 can be a room including a floor 130, shoes 132 and 134, rugs 136 and 138, and radiator 140. A user may desire to segment an image of the scene 112 into separate images or layers having one or more of any of these, or other, objects, for example. The scene also includes a depth 114, and a depth image can express the various depths of the above listed objects in relation to the sensor on a per-pixel basis. The scene 112 is further shown in FIG. 2.

The RGB sensor 104 and material property sensor 108 each captures a respective image of the scene 112 at identical or close vantage points 106 and 108 (e.g., viewpoints). The relative capture points/coordinates, or a calibration relative positioning 158 between the two respective sensors 104 and 108, are recorded for aligning the two images after capture. The RGB sensor 104 captures at least one first RGB/RGB-Depth/Depth sensing image, and the material property sensor 108 captures at least one material property image. One example of a material property image is an IR image, as such image can accurately represent material properties, in particular, molecular vibration, which produce radiation in the IR spectrum. The IR images can be captured either passively or actively. The near-IR frequency range (e.g., approximately 1 µm) typically requires active illumination, while the thermal frequency range (e.g., approximately 10 µm) can be captured passively without active illumination.

In examples, the RGB sensor 104 can be a standard digital camera, such as a cell-phone camera. The material sensor 108 can be a thermal camera, such as the Seek Thermal™ product which operatively connects to a mobile device (e.g., phone, smartphone, tablet, glass). One integrated device (e.g., the mounting apparatus 102) can mount both the RGB sensor 104 and the material (e.g., thermal) sensor 108, such as in the FLIR ONE™ product. Optionally, the sensor setup can also include a depth sensor, for example, the Structure Sensor. The depth sensor produces a depth image having each pixel value be a distance of that particular pixel from the sensor. The depth sensor can be part of the RGB sensor 104, part of the material property sensor 108, part of a third sensor (not shown) or a separate sensor.

Referring again to FIG. 1, for each set of images (e.g., an RGB image 150, material sensor image 152, and depth image 153 of the scene 112) examples of the present invention analyze the images to produce a segmented image 156. A segmentation module 160 receives the RGB image 150, material sensor image 152, and depth image 153 of the same scene. The segmentation module 160 also employs at least the RGB image 150 and material sensor image 152, and can optionally employ the depth image 153 and optional calibration data 154, to produce the segmented image 156.

The segmentation module 160 then produces the segmented image 156 by, first, warping the images to compensate for any differences in viewpoint (e.g., RGB vantage point 106 and material property vantage point 110). The RGB image 150 and material property image 152 are captured by sensors 104 and 108 that can be placed in close proximity to the mounting apparatus 102. Therefore, the respective images 150 and 152 may capture the scene from slightly different vantage points 106 and 110. Warping the images can be performed in different ways depending on the information provided to the segmentation module 160.

If the set of images received by the segmentation module 160 includes a depth image 153 in addition to the RGB image 150 and material property image 152, and if the segmentation module 160 receives calibration data 154 indicating the sensors are pre-calibrated (e.g., their relative 3D positions on the device are known), the segmentation module 160 projects non-depth images onto a 3D surface given by the depth sensor, and then projects the image back onto a common viewpoint.

If the segmentation module 160 does not receive the depth image 153 or the calibration data 154, the segmentation module 160 warps the images via pairwise correspondences of feature points in the RGB and material property images 150 and 152.

In many cases, it is impossible to align the RGB and material property images 150 and 152 so that all of the pixels are comparable because of occlusion artifacts, which can vary with positions of the respective sensor 104 and 108 position. However, this affects only a small proportion of pixels and requires no special treatment, as it is no different from the situation whereby one or more of the RGB and material property sensors 104 and 108 yield incomplete data due to noise or other causes.

Once the images are pixel-to-pixel aligned, the segmentation module can segment the RGB and material property images 150 and 152 based on the complementary information contained in each image 150 and 152.

Several techniques exist that perform segmentation (see, for example, Rother et al. "GrabCut-Interactive Foreground Extraction using Iterated Graph Cuts" SIGGRAPH, 2004, which is incorporated by reference in its entirety). In examples, the segmentation can be performed by applying a modified Markov Random Field (MRF) approach with energy that takes contributions from each image (see, e.g., Li, "Markov Random Field Modeling in Image Analysis", Advances in Pattern Recognition, 2009).

The system and method of examples of the present invention produce a better result because visible-light data and IR-range data are different and complementary. IR-range radiation is emitted as a function of the molecular structure of a material. Even materials at the same temperature emit differently IR-range radiation in the thermal IR band because of emissivity differences. Even if the system actively supplies IR-range radiation to enhance this process, absorbing and re-emitting the radiation remains for practical purposes quite different from the reflection of visible light.

FIGS. 2A-C are example images illustrating a common scene. FIG. 2A illustrates an RGB scene 200. The RGB scene 200 (represented in greyscale) shows light captured from the visual light spectrum. When performing traditional image segmentation on the RGB scene 200 alone, having only data from the visual light spectrum, a segmentation system can determine the segmentation lines shown in blue in FIG. 2A. While these lines can be helpful, a person of ordinary skill in the art can see that they are incomplete in tracing all of the objects.

FIG. 2B illustrates an RGB scene 220 having an overlaid IR scene 222 being a thermal emissivity image. The IR scene 222 detects thermal properties of the scene, as shown by the different colors representing heat of the radiator of the scene. As the IR scene 222 has more detail around the radiator and shoes of the scene, segmentation can find more accurate segmentation borders for that area. The segmentation borders are shown by the solid red lines.

FIG. 2C shows a segmented scene 240. The segmented scene 240 employs the analysis of both the RGB scene 200 and the combined RGB and IR scenes 220 and 222 to create borders segmenting the radiator, shoes, and one of the rugs. Therefore, the blue segmentation borders and red segmentation borders can be combined to better segment the images. The boundaries expressed by the RGB image are complementary to the boundaries expressed by the IR scene 222 (e.g., the thermal emissivity image). Indeed, the segmentation module 416 works by considering the image to be a graph of connected pixels, and computing the most likely labeling of the pixels that classifies them into separate segments. Where there is a strong intensity gradient of the pixels, the segmentation module 416 identifies this as a potential border between two segments. If one takes the example of scene 222 outlined by the RGB sunlight on the upper half and by the thermal image on the lower half, the segmentation module 416 is very unlikely to find a segmentation that separates the shoes from the rest of the scene using the RGB or the thermal information alone, because in each, a strong gradient exists only over part of the shoe image, top of the shoe in one image, bottom in the other. To combine the two and increase the chances of a successful segmentation, the method may perform inside segmentation module 416 the following operation on the input data: for a given pixel of the aligned thermal and RGB(D) images, the method may consider its gradient to be equal to the maximum of its gradient in each of the images. Performing this operation on all the pixels of all the aligned images, will yield an image, let this be called the maxvar image. When examining the maxvar image, one will observe a strong variation of intensity along both the top and bottom contours of the shoe. Therefore, by segmenting on the basis of the maxvar image, the method may have a much higher probability of successfully identifying the shoes as separate segments of the image.

Figure 3:
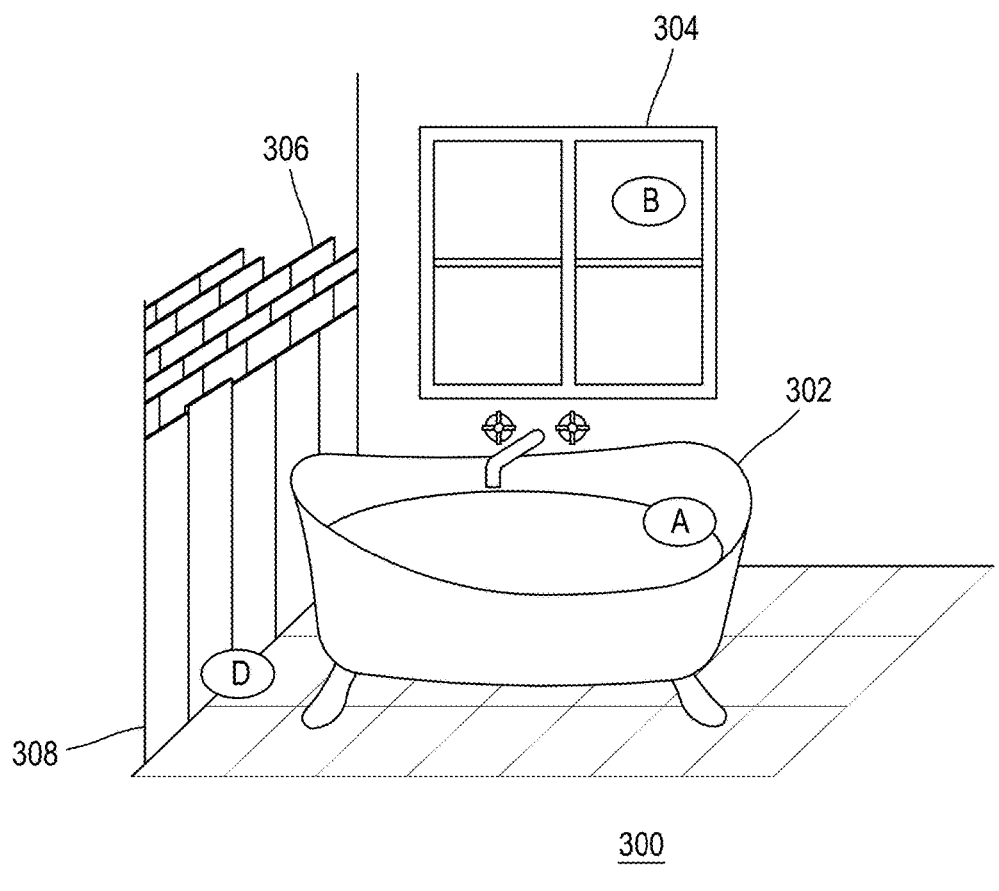
FIG. 3 illustrates another scene to be reconstructed as a 3D-model.

Examples of the present invention can also be employed as part of a system that reconstructs virtual 3D models from real life scenes. FIG. 3 illustrates another scene 300 to be reconstructed as a 3D model. For example, a system based on only RGB and depth data, without material sensor data, observing a scene having a brown wood wall 308 and a brown brick 306 wall in close proximity, cannot differentiate these two materials if the brown color of the two walls 306 and 308 is too similar. However, in examples of the present invention, the addition of information from a thermal IR camera can help to separate the brown wood wall 308 from the brown brick wall 306 because the different emissivities of the materials appear separate on the IR image. When the images are combined, the segmentation process determines boundaries based on a transition in the data in any one of the images. In this case, the thermal IR image contributes key boundary information, but other boundary info from other material property images can be employed.

As another example, RGB images of water, such as the filled bathtub 302, are difficult to segment by visual means because water reflects, transmits, and diffracts light. Similarly, the reflections, transmissions, and diffusions of glass of a window 304 can similarly pose difficulties. These reflections, transmissions, and diffractions visually can confuse the water with its surroundings. However, water has a distinct material emissivity, and therefore stands out in thermal images, and is therefore easy to distinguish and separate.

Figure 4:
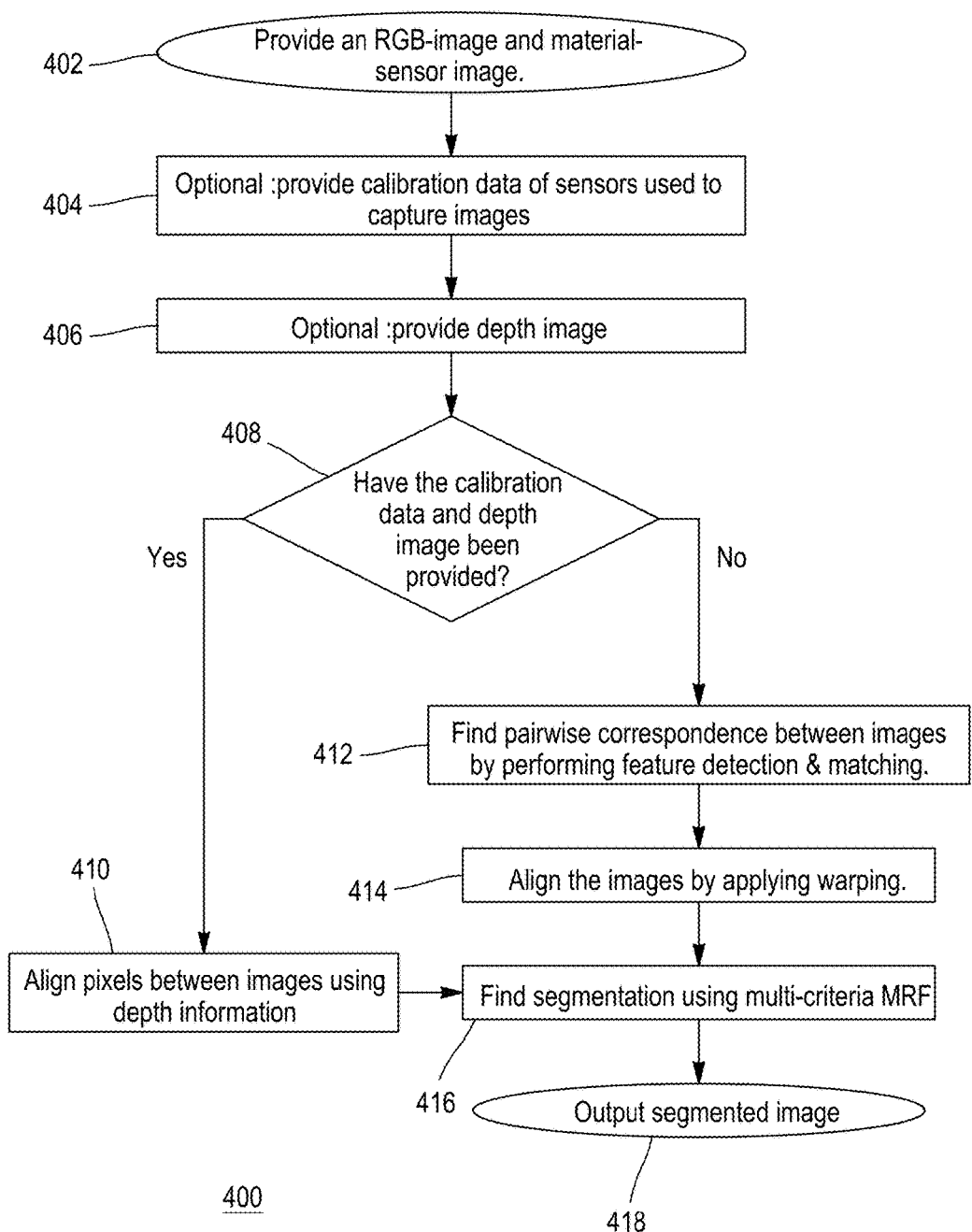
FIG. 4 is a flow diagram illustrating an example of the present invention.

FIG. 4 is a flow diagram 400 illustrating examples of the present invention. The process begins by capturing an RGB image and a material sensor image, and providing the images to a segmentation module (402). Optionally, the process can provide calibration data of the sensors used to capture images (404). The calibration data can include a relative positioning between the sensors, relative coordinates of the sensors, and/or any other information that can assist with aligning the resulting images of the sensors. Optionally, the process can provide a depth image to the segmentation module as well (406). The depth image is an image including, for each pixel, a depth representing a distance from the sensor to the object at that particular pixel.

The segmentation module may then determine whether the optional calibration data (404) and depth image (406) have been provided (408). If not, the segmentation module may find a pairwise correspondence between the RGB image and material sensor image by performing feature detection and matching (412). The segmentation module may then align the images by applying warping (414). Then, the system may find a segmentation of the images using the modified multi-criteria MRF of the present invention (416). The system may then output the segmented image (418).

If the calibration data and depth image are available (408), however, the system may align the pixels of the two images using depth information (410). Then, the system may find a segmentation of the images using the modified multi-criteria MRF of the present invention (416). The system then outputs the segmented image (418).

Figure 5:
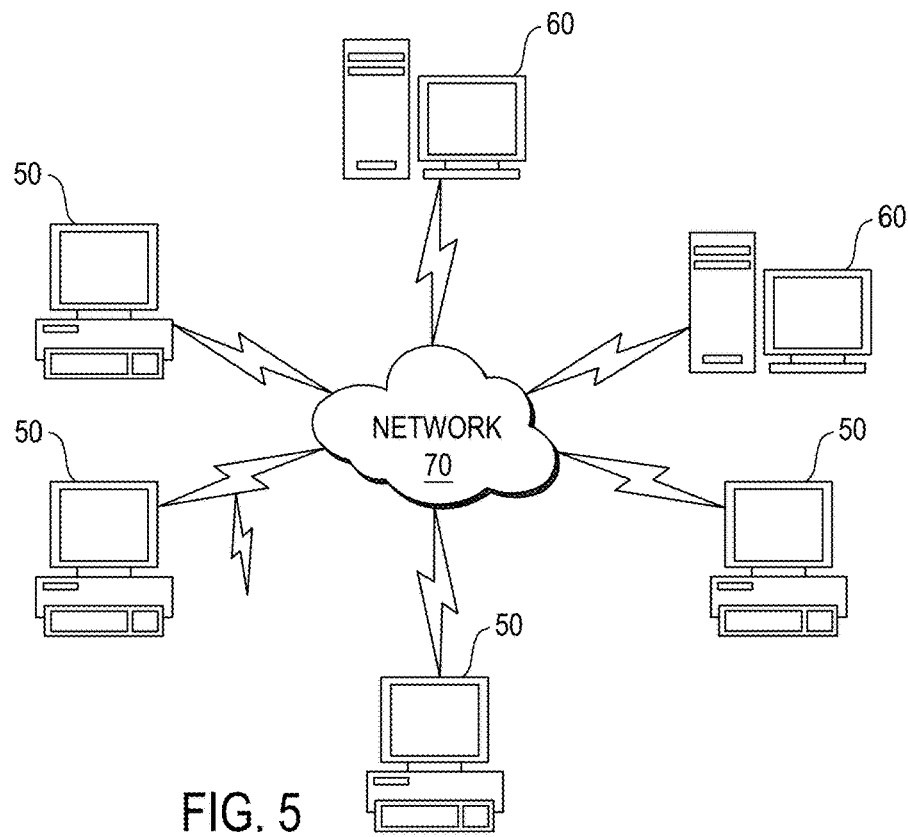
FIG. 5 illustrates a computer network or similar digital processing environment in which examples of the present invention may be implemented.

FIG. 5 illustrates a computer network or similar digital processing environment in which examples of the present invention may be implemented.

One or more client computers and/or devices 50 and one or more server computers 60 provide processing, storage, and input/output devices executing application programs and the like. The client computers and/or devices 50 can also be linked through communications network 70 to other computing devices, including other client devices and/or devices 50 and server computers 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
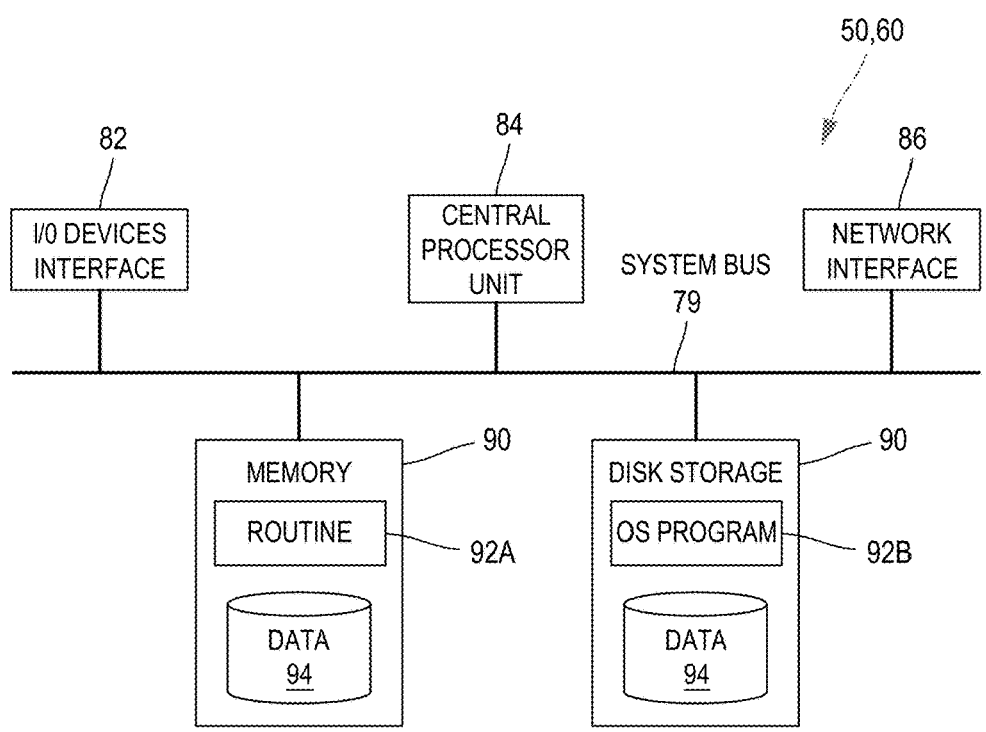
FIG. 6 is a diagram of an example internal structure of a computer (e.g., client processor/device or server computers) in the computer network of FIG. 5.

FIG. 6 is a diagram of an example internal structure of a computer (e.g., client computer or device 50 or server computer 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) and that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions or routines 92A and data 94 used to implement an example of the present invention (e.g., alignment module and segmentation module code detailed above). Disk storage 95 provides non-volatile storage for computer software instructions or operating system programs 92B and data 94 used to implement examples of the present invention. A central processor unit 84 is also attached to the system bus 79 and provides for the execution of computer instructions.

In examples, the software instructions 92A-B and data 94 make up a computer program product (which may be generally referenced as 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another example, at least a portion of the software instructions may also be downloaded over a cable communication and/or wireless connection. In other examples, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The methods are computer-implemented. This means that the steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

Figure 7:
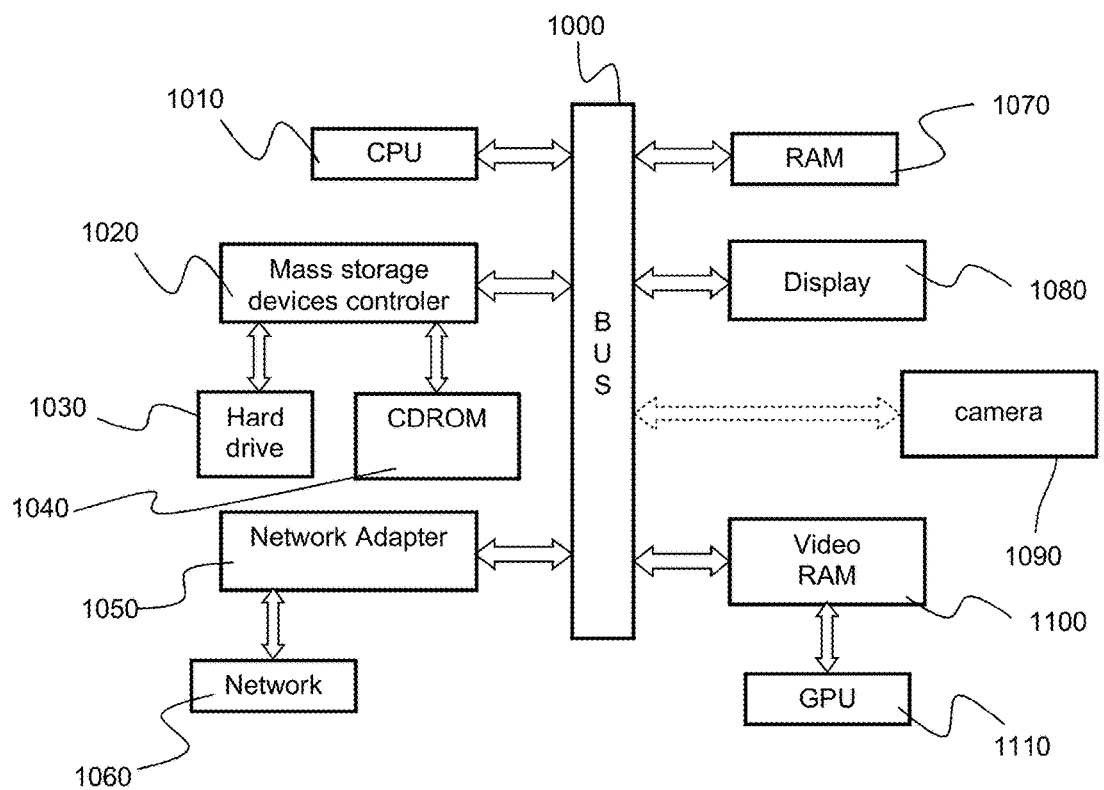
FIG. 7 illustrates an example of the system.

FIG. 7 shows an example of the system.

The system of the example comprises a central processing unit (CPU) 1010 connected to an internal communication BUS 1000, a random access memory (RAM) 1070 also connected to the BUS. The system is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The system may be wirelessly coupled to a camera 1090. The camera may include several sensors mounted thereon and camera 1090 may be a video camera.

The computer program may comprise instructions executable by a computer, the instructions comprising means for causing the above system to perform the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Figure 8:
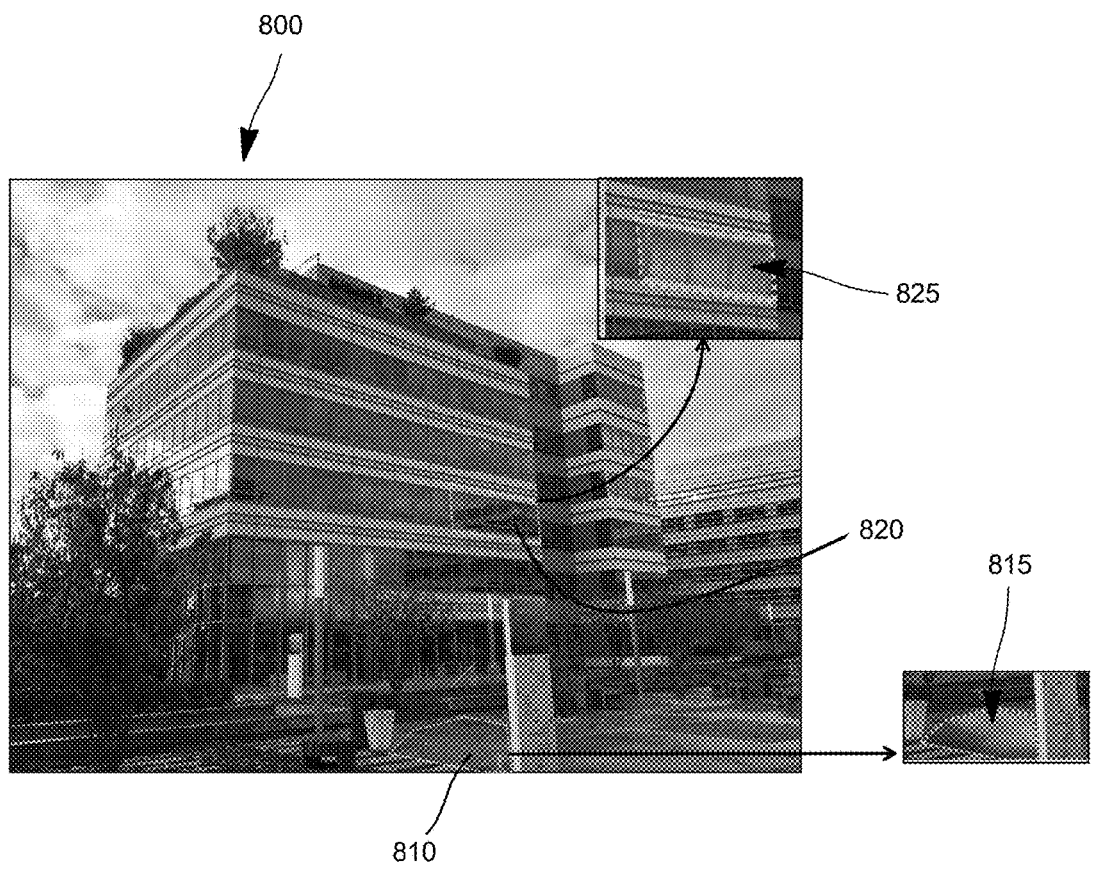
FIG. 8 illustrates a building exterior scene.

FIG. 8 shows an example of an RGB image 800 (represented in greyscale) of a building exterior scene that can be segmented accurately by the invention. Highly reflective surfaces such as puddle 810 or transparent surfaces such as glass 820 are difficult to segment in the visible spectrum, because of spurious information transmitted or reflected from surroundings. As can be seen, the same surfaces are perfectly opaque in thermal images 815 and 825 which do not display misleading reflections. Such thermal images 815 and 825 may thus adequately complement RGB image 800 to segment the scene.

Figure 9:
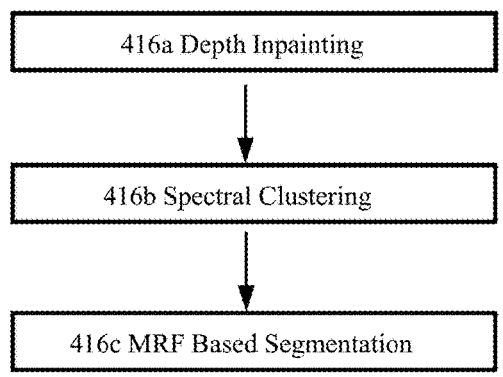
FIG. 9 illustrates an example of a multi-criteria MRF.

Efficient examples of the MRF energy minimization are now discussed with reference to FIG. 9. Such examples may be implemented for segmentation module 416.

In general, the MRF energy may consist of the smoothness term (i.e. no other term).

In order to increase the speed of convergence however, the energy may in examples further comprise a data term. The data term may penalize assignment of pixels each to any segment, the penalization being based for each pixel on a respective probability distribution that provides for each of the set of segments a respective probability that the pixel belongs to the segment independently of other pixels, the penalization for any given pixel increasing as the probability provided by the probability distribution respective to the given pixel decreases. The probability distributions constitute an pre-inference of the segment to which a pixel should belong. The MRF energy minimization then refines such pre-inference.

The probability distributions may, in examples provided below, be learnt based on a pre-clustering of pixels. Clustering methods are usually relatively fast, such that such an example increases speed of convergence of the method.

Before that, an optional depth pre-processing (e.g. inpainting 416*a*) is discussed.

The depth data ("D" in RGB-D), if present, is characterized by considerable instability. Any given depth frame typically presents noise and holes (areas of non-available pixels), due to inability of the depth sensor to function correctly over 100% of a scene. The noise and holes can be due to many factors, for example shiny or transparent objects in the scene, excessively bright lights, scene depth higher than the maximum range, or geometric discontinuities in the scene. Because of this, in examples the technique described in paper "Anh Vu Le, Seung-Won Jung, and Chee Sun Won: *Directional Joint Bilateral Filter for Depth Images*, In Sensors Journal 2014 11362-11378" may be applied to make the depth map complete without holes or noise, before proceeding to the segmentation. When both color and depth are present, this technique exploits the color image to locate the edge pixels in the depth map, making for improved performance over methods that perform de-noising and hole filling on depth data alone.

The optional pre-clustering mentioned above is now discussed. An example implementing a Spectral Clustering 416*b* is presented.

The method may first perform a coarse initial segmentation called "spectral clustering". This may then be given as input to the MRF which produces the final high quality segmentation.

The clustering may work as follows, based on the following notations:
n->pixel index
C->graph edges (an edge links two neighbor pixels in our case)
V->set of graph nodes (in our case, the set of pixels)
$l_n$->the label of pixel n, i.e. its segment
c->the number of segments ($l_n \in \{1, \ldots, c\}$)
l->labeling, $l=(l_0, \ldots, l_{N-1})$ where N is the number of pixels Unless noted otherwise, the following refers to a standard scenario in which the input data includes 3 color channels R, G, B, a thermal and a depth channel, for a total dimension of 5. Other configurations are possible, such as the absence of depth data, or the presence of several thermal and/or other material property channels. This does not change the approach.

The discussed examples of the method perform the clustering via a spectral clustering which comprises an over-segmentation of the pixels followed by an iteration of a fusion of segments. The number of segments reached when the iteration ends corresponds to the labels (and thus the segments) available for the MRF minimization.

The spectral clustering may form an over-segmentation of the pixels. Each fusion may then be based on a cut cost to partition a segment, the cut cost depending on a weight assigned to pairs of neighbor pixels, the weight assigned to a given pair of neighbor pixels decreasing as a difference between the physical signal vectors corresponding to the pixels of the given pair increases.

The clustering step may establish a number of segments and give an initial rough segment label to each pixel, this classification being refined later by the MRF.

An approach is to over-segment the image into a partition $\pi^k$ of k segments, with k much higher than the number of segments actually expected (typically k=50).

The graph to be segmented G is built up from the pixels in the image (V set of nodes $x_m$) and edges linking two neighbor pixels (C set of edges $\{x_m, x_n\}$). One may give weights to these edges in the form:

$$w(x_m, x_n) = \begin{cases} \exp(-\beta \| x_m - x_n \|^2) & \text{if } \{x_m, x_n\} \in C \\ 0 & \text{otherwise} \end{cases}$$

Where $x=(R_n, G_n, B_n, Th_n, Z_n)$ with each dimension centered and reduced (e.g. normalized) and $\|x\|$ is the euclidian norm. One can also replace the Euclidian norm by a so-called "after-weighting Euclidian distance" $\|\alpha^T x\|$ where $\alpha$ is a vector of scale factors applied to each dimension, $$a = \left( \frac{1}{\sqrt{3}}, \frac{1}{\sqrt{3}}, \frac{1}{\sqrt{3}}, 1, 1 \right)$$

works particularly well in a case of a plurality of images consisting of an RGB image, a depth image and an infrared image, where the first three dimensions of a correspond to the RGB channels and the two other dimensions of α correspond to the depth and infrared channels.

β is a positive number which may be chosen to be:

$$\beta = \left( \frac{2}{|C|} \Sigma_{(m,n) \in C} \| x_m - x_n \|^2 \right)^{-1}$$

As described in paper "Andrew Y Ng, Michael I Jordan, Yair Weiss, et al, *On spectral clustering: Analysis and an algorithm, in Advances in neural information processing systems*, 2:849-856, 2002" one may introduce adjacency matrix A, a degree matrix D and a « graph Laplacian » L:

$$A_{ij} = w(x_m, x_n)$$

$$D_{ij} = \begin{cases} \Sigma_{x_m \in V} w(x_m, x_i) & si \ i = j \\ 0 & \text{otherwise} \end{cases}$$

$$L = D - A$$

One can in this manner define a cost of « normalized cut » to partition each segment $nCut(C_j, \overline{C}_j)$ depending on the edge weights:

$$nCut(C_j, \overline{C}_j) = \frac{c'_j L c_j}{c'_j D c_j}$$

Where:
$c_j$ is the indicator vector of segment $C_j$;
$c_j^i = 1$ if $x_i \in C_j$
$c_j^i = 0$ otherwise.

Defining $z_j = D^{1/2} x_j$ and the "Normalised Laplacian" $L_N = D^{-1/2} L D^{-1/2}$ one can express the normalized cut as:

$$nCut(C_j, \overline{C}_j) = \frac{z'_j L_N z_j}{z'_j z_j}$$

One can extend the normalized cut to define a graph partition energy corresponding to the partition of the graph into k segments $\pi^k$:

$$\text{energy}(\pi^k) = \Sigma_j nCut(C_j, \overline{C}_j).$$

This energy may be minimized by the k eigenvectors associated to the k smallest non-null eigenvalues of $L_N$. Relaxing the discrete constraint ($c_j \in \{1,0\}^n$), and allowing the indicator vectors to take real values $\tilde{x}_j = D^{-1/2} \tilde{z}_j \in \mathbb{R}^n$, one can approximate the clustering by the eigenvectors $e_j$ of the normalized laplacian: $\tilde{z}_j = e_j$. However, the vectors are not in general piecewise constant. To find the discrete indicator vector for each cluster (segment) $C_j$, one may apply the k-means algorithm in the space $H_k$ of dimension k as follows: for each node i of the graph, one may associate a vector $p_i$, such that $(p_i)_j = (e_j)_i$. These vectors are then clustered by k-means.

The method may obtain in this way a segmentation of the image into k segments, and the method may be followed by a technique for the fusion of segments to obtain the desired total number.

The technique may works as follows:

One may define a gain function for the fusion of two segments as:

$$\text{fusion}(C_i, C_j) = nCut(C_i, \overline{C}_i) + nCut(C_j, \overline{C}_j) - nCut(C_i \cup C_j, \overline{C}_i \cup \overline{C}_j)$$

Then, the method may fuse the segments by order of decreasing gain, and this allows to start off with a high number of segments k and obtain in the end an arbitrary lower number of segments c.

The method now has a rough segmentation defining a label on each pixel. This rough segmentation or clustering may be the input for the final segmentation.

Markov Random Field (MRF) Based Segmentation 416c based on such a pre-clustering is now discussed.

The method may use the clustering (rough segmentation) from the previous step as input for the MRF Based Segmentation, which yields the definitive, refined segmentation.

To use the clustering as input, the method may convert the per-pixel labels into a probability of being in a given segment.

For this, the method may apply a mixture of c Gaussians in the space $H_d$ (choosing d≤c) to obtain the probability P that a pixel belongs to a segment independently of his neighbors. This model of Gaussian Mixture may be learnt by the Expectation-Maximization algorithm described in paper "Simon J. D. Prince, *Computer Vision: Models, Learning, and Inference*, in Cambridge University Press, chapter 7, section 4".

Then the method may refine the segmentation by inferring labels in a Markov Random Field (MRF) on the same graph used for the Spectral Clustering.

The MRF energy may be:

$$E(l) = U(l) + \lambda S(l)$$

Where:
$U = \Sigma_n -\log P(l_n)$.
$P(l_n)$ is given by the Gaussian mixture model.
$S = \Sigma_{(m,n) \in C} 1_{l_m \neq l_n} \exp(-\beta \|x_m - x_n\|^2)$
U is called the data term. This term forces a pixel to have the label predicted by the Gaussian mixture.
S is called the smoothness term. It forces a pixel to have the same label as its neighbors, all the more so if these neighbors have similar characteristics (colors, depth, thermal).

The combination of U and S allows the segmentation of the image into particularly coherent zones. The frontiers between the zones correspond to strong gradients in the (R, G, B, Th, Z) space. The λ factor on the smoothness term, ponders these two influences. Large values of λ promote coherent and uniform segments, but these might strongly deviate from the initial information provided by the clustering step. Inversely, for small values, the pixel tends to keep the label that was originally given to it by the clustering, regardless of its neighbors.

A survey of algorithms that may be implemented by the method to solve this pairwise MRF can be found in paper "J. Kappes et al, *A Comparative Study of Modern Inference Techniques for Discrete Minimization Problems*, in CVPR 2013". In a particularly efficient implementation the method may perform this task by using graph cut alpha expansion, as implemented by the gco-v3.0 code (provided for example at the following URL: http://vision.csd.uwo.ca/code/).

The method may more generally implement a generalization of this MRF taking as edges a larger neighborhood than just the immediately neighbor pixels. In such a case S is replaced by $$S = \Sigma_{(m,n) \in C} 1_{l_m \neq l_n} dist(m,n)^{-1} \exp(-\beta \|x_m - x_n\|)$$

Where:
dist(m,n) is the distance separating pixels m and n.
C (the set of edges of the Markov Random Field graph) is for example a set of all edges corresponding to pairs of pixels having a distance (indifferently Euclidian distance or graph distance) below a predetermined threshold.

This generalizes the initial definition, that is the set of all edges corresponding to pairs of neighboring pixels (which indifferently means pairs of pixels positioned aside or one on top of the other or pairs of pixels aside, one on top of the other, or also in diagonal).

Thus, depending on the predetermined threshold retained, C may be reduced to the initial definition (in which case the term $dist(m,n)^{-1}$ in the formulation of S is merely a superfluous notation), or C may be enlarged to all pairs of pixels (provided that the threshold is large enough).

The invention claimed is:

1. A computer-implemented method of producing a segmented image of a scene, the segmented image including pixels each assigned to a respective one of a set of segments, the method comprising:
obtaining a plurality of images of the scene, each image corresponding to a respective acquisition of a physical signal, the plurality of images including at least two images corresponding to different physical signals; and
generating the segmented image based on the plurality of images, by determining a distribution of labels that minimizes an energy defined on a Markov Random Field (MRF) graph comprising nodes and edges, each node corresponding to a respective pixel and being associated to a respective label, each edge corresponding to a respective pair of pixels having a distance below a predetermined threshold, the labels corresponding to all different assignments of a pixel to a respective one of the set of segments, the energy comprising a smoothness term that penalizes assignment of pairs of pixels that correspond to an edge to different segments, the penalization for any given pair decreasing as a distance between the pixels of the given pair increases, the penalization for the given pair further decreasing as a difference between the physical signal vectors corresponding to the pixels of the given pair increases.

2. The method of claim 1, wherein the smoothness term noted S is of the type $$S = \sum_{(m,n) \in C} 1_{l_m \neq l_n} \, dist(m,n)^{-1} pen(\|x_m - x_n\|)$$

where:
m and n are pixel indices,
C is the set of edges of the Markov Random Field graph,
$l_m$ is the label associated to pixel m and $l_n$ is the label associated to pixel n,
$1_{l_m \neq l_n}$ is an indicator function equal to 1 when labels $l_m$ and $l_n$ are different and equal to 0 otherwise,
$dist(m,n)^{-1}$ is the inverse of a distance between pixel m and pixel n,
$x_m$ is the respective physical signal vector corresponding to pixel m and $x_n$ is the respective physical signal vector corresponding to pixel n,
$\|x_m - x_n\|$ is a distance between physical signal vector $x_m$ and physical signal vector $x_n$, and
pen( ) is a decreasing function.

3. The method of claim 2, wherein pen( ) is of the type $\exp(-\beta \|x_m - x_n\|)$ where β is a positive number.

4. The method of claim 1, wherein the energy further comprises a data term that penalizes assignment of pixels each to any segment, the penalization being based for each pixel on a respective probability distribution that provides for each of the set of segments a respective probability that the pixel belongs to the segment independently of other pixels, the penalization for any given pixel increasing as the probability provided by the probability distribution respective to the given pixel decreases, the probability distributions being learnt based on a clustering of pixels.

5. The method of claim 4, wherein the data term is of the type:

$$U = \sum_n -\log P(l_n)$$

where:
- n is a pixel index,
- $l_n$ is the label of pixel n, and
- $P(l_n)$ is the probability provided by the probability distribution respective to pixel n for the segment corresponding to label $l_n$.

6. The method of claim 4, wherein the clustering is performed via a spectral clustering followed by an iteration of a fusion of segments, a number of segments reached when the iteration ends corresponding to the labels.

7. The method of claim 4, wherein the probability distributions form a Gaussian mixture.

8. The method of claim 7, wherein the Gaussian mixture is learnt by an Expectation-Maximization algorithm.

9. The method of claim 4, wherein the energy is of the type $E(l)=U(l)+\lambda S(l)$ where $\lambda$ is a ponderation factor and l is a distribution of labels.

10. A non-transitory data storage medium having recorded thereon a computer program comprising instructions for performing a computer-implemented method of producing a segmented image of a scene, the segmented image including pixels each assigned to a respective one of a set of segments, the method comprising:
obtaining a plurality of images of the scene, each image corresponding to a respective acquisition of a physical signal, the plurality of images including at least two images corresponding to different physical signals; and
generating the segmented image based on the plurality of images, by determining a distribution of labels that minimizes an energy defined on a Markov Random Field (MRF) graph comprising nodes and edges, each node corresponding to a respective pixel and being associated to a respective label, each edge corresponding to a respective pair of pixels having a distance below a predetermined threshold, the labels corresponding to all different assignments of a pixel to a respective one of the set of segments, the energy comprising a smoothness term that penalizes assignment of pairs of pixels that correspond to an edge to different segments, the penalization for any given pair decreasing as a distance between the pixels of the given pair increases, the penalization for the given pair further decreasing as a difference between the physical signal vectors corresponding to the pixels of the given pair increases.

11. A system comprising:
a processor coupled to a memory having recorded thereon a computer program comprising instructions for performing a computer-implemented method of producing a segmented image of a scene, the segmented image including pixels each assigned to a respective one of a set of segments, the instructions causing the processor to be configured to
obtain a plurality of images of the scene, each image corresponding to a respective acquisition of a physical signal, the plurality of images including at least two images corresponding to different physical signals, and
generate the segmented image based on the plurality of images, by determining a distribution of labels that minimizes an energy defined on a Markov Random Field (MRF) graph comprising nodes and edges, each node corresponding to a respective pixel and being associated to a respective label, each edge corresponding to a respective pair of pixels having a distance below a predetermined threshold, the labels corresponding to all different assignments of a pixel to a respective one of the set of segments, the energy comprising a smoothness term that penalizes assignment of pairs of pixels that correspond to an edge to different segments, the penalization for any given pair decreasing as a distance between the pixels of the given pair increases, the penalization for the given pair further decreasing as a difference between the physical signal vectors corresponding to the pixels of the given pair increases.

12. The system of claim 11, wherein the smoothness term noted S is of the type $$S = \sum_{(m,n) \in C} 1_{l_m \neq l_n} \, dist(m,n)^{-1} pen(\|x_m - x_n\|)$$

where:
- m and n are pixel indices,
- C is the set of edges of the Markov Random Field graph,
- $l_m$ is the label associated to pixel m and $l_n$ is the label associated to pixel n,
- $1_{l_m \neq l_n}$ is an indicator function equal to 1 when labels $l_m$ and $l_n$ are different and equal to 0 otherwise,
- $dist(m,n)^{-1}$ is the inverse of a distance between pixel m and pixel n,
- $x_m$ is the respective physical signal vector corresponding to pixel m and $x_n$ is the respective physical signal vector corresponding to pixel n,
- $\|x_m - x_n\|$ is a distance between physical signal vector $x_m$ and physical signal vector $x_n$, and
- pen( ) is a decreasing function.

13. The system of claim 12, wherein pen( ) is of the type $\exp(-\beta\|x_m - x_n\|)$ where $\beta$ is a positive number.

14. The system of claim 11, wherein the energy further comprises a data term that penalizes assignment of pixels each to any segment, the penalization being based for each pixel on a respective probability distribution that provides for each of the set of segments a respective probability that the pixel belongs to the segment independently of other pixels, the penalization for any given pixel increasing as the probability provided by the probability distribution respective to the given pixel decreases, the probability distributions being learnt based on a clustering of pixels.

15. The system of claim 14, wherein the data term is of the type:

$$U = \sum_n -\log P(l_n)$$

where:
- n is a pixel index,
- $l_n$ is the label of pixel n, and
- $P(l_n)$ is the probability provided by the probability distribution respective to pixel n for the segment corresponding to label $l_n$.

16. The system of claim 14, wherein the processor is further configured to perform the clustering via a spectral clustering followed by an iteration of a fusion of segments, a number of segments reached when the iteration ends corresponding to the labels.

17. The system of claim 14, wherein the probability distributions form a Gaussian mixture.

18. The system of claim 17, wherein the Gaussian mixture is learnt by an Expectation-Maximization algorithm.

19. The system of claim 14, wherein the energy is of the type $E(l)=U(l)+\lambda S(l)$ where $\lambda$ is a ponderation factor and $l$ is a distribution of labels.

* * * * *